Jan. 14, 1969   L. G. MILLER   3,421,493
PORTABLE COLLAPSIBLE BARBECUE
Filed Feb. 16, 1967
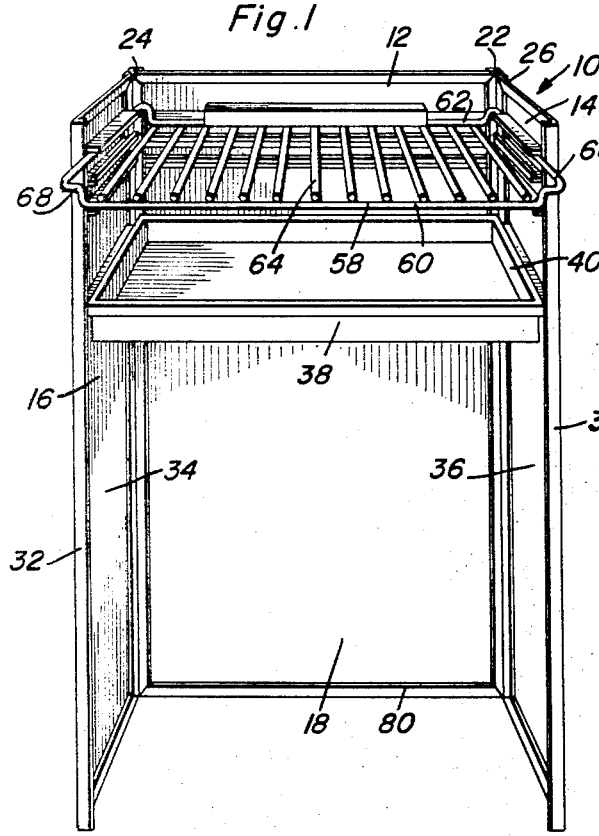
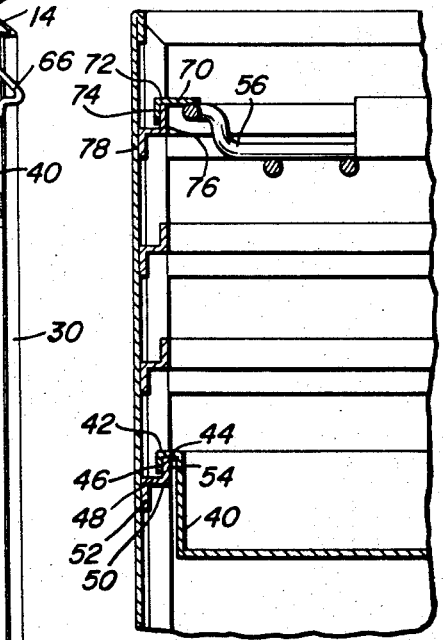
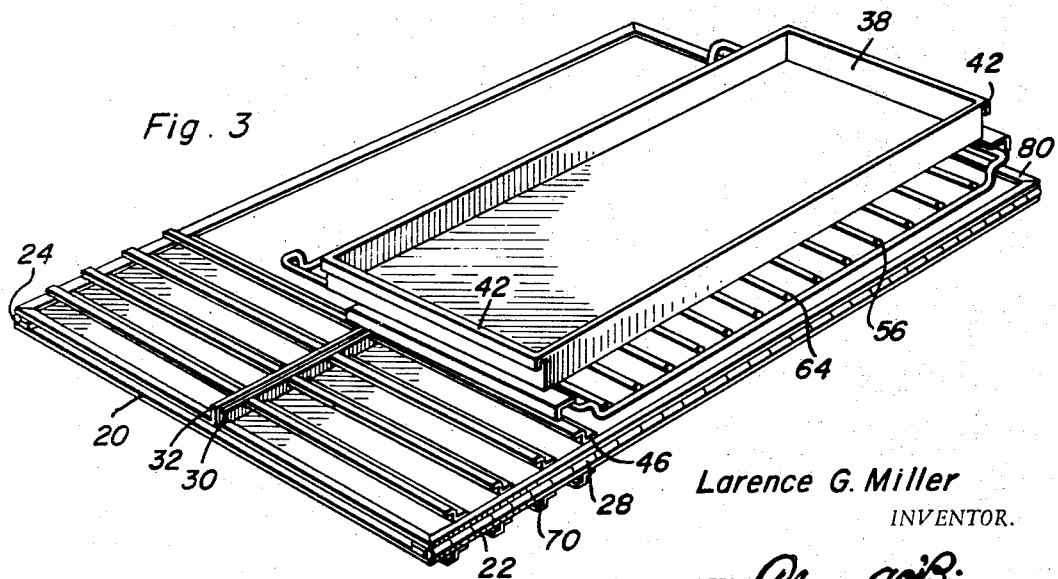
Larence G. Miller
INVENTOR.
BY
Attorneys United States Patent Office 3,421,493
Patented Jan. 14, 1969

3,421,493
PORTABLE COLLAPSIBLE BARBECUE
Larence G. Miller, 1499 Ringe Lane,
Las Vegas, Nev. 89110
Filed Feb. 16, 1967, Ser. No. 616,519
U.S. Cl. 126—25    3 Claims
Int. Cl. F24b 13/00; F24c 1/16; F24b 3/00

ABSTRACT OF THE DISCLOSURE

Three hingedly interconnected single panel walls constituting a back wall and opposed side walls. The opposed side walls are of a width equal to approximately half that of the back wall and are foldable into overlying position with the outer face of the back wall for collapsing the barbecue into a compact unit. When erected, the opposed walls have series of hook-like mounting ledges which removably receive both a firepan and a cooking grill which in turn stabilize the erected structure.

---

This invention generally appertains to improvements in outdoor cooking stoves and more particularly relates to a novel portable collapsible barbecue, which is of extremely simple and compact construction but which functions in a most efficient and effective manner for the barbecuing of foodstuffs outdoors.

An important object of the present invention is to provide a compact, simple and inexpensive collapsible barbecue which can be erected from a collapsed condition into an operative condition and thereby placed in condition for use, within a matter of seconds and without the expenditure of any appreciable amount of labor or the use of any tools and which, after use, can be folded into a collapsed or folded condition for transportation within a minimum of space and for storage within a very small amount of space.

Another important object of the present invention is to provide a novel portable collapsible barbecue which is composed of a minimum number of parts and which is formed so that the parts are structurally and functionally related in a very simple and mechanically uncomplicated manner.

A meritorius feature of the present invention resides in the provision of a rigid thin panel formed back wall having an inner flat face and an outer flat face and having opposing side edges with opposing thin side panel walls equal in height to the back panel wall with the side panel walls having side edges hinged to the opposing side edges of the back wall so that the side walls are foldable over onto the outer face of the back wall with the side wall panels being of equal dimensions and of combined width equal to the transverse width of the back wall panel so that the width of a side wall panel is equal to one half of the back wall panel or, in other words, the side wall panels have free edges which when the side wall panels are folded onto the outer face of the back wall and lie flat thereon such free edges lie along the longitudinal center line of the back wall panel in contact with each other, whereby an extremely compact and simple frame construction is realized.

Another meritorious feature of the present invention is to provide a removable fire pan and a removable grill and to provide means on the inner faces of the side wall panels and the back wall panel and on the fire pan and on the grill for removably supporting the fire pan in a horizontal position and supporting the grill in selected horizontal positions above the fire pan.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of the portable collapsible barbecue, showing the same in erected condition for use;

FIGURE 2 is an enlarged vertical sectional view, showing the means for attaching the fire pan and the grill to the inner faces of the side walls and the grill wall, and, FIGURE 3 is a view in perspective of the barbecue, showing the same in a colapsed or folded state.

Referring now more particularly to the accompanying drawings, the numeral 10 generally designates a portable collapsible barbecue, which includes a flat, rectangular back wall 12 and flat, rectangular opposing side walls 14 and 16. The walls are fabricated or formed from suitable sheet metal sections or thin panels so that the walls are of simple but sturdy panel construction. The back wall 12 is provided with an inner face 18 and an outer face 20 and is formed with opposing side edges 22 and 24.

The side wall panels 14 and 16 have inner side edges 26, which are joined by piano hinges 28 along their entire length to the side edges 22 and 24 whereby the side wall panels 14 and 16 may be folded into a flat side by side superimposed relationship on the rear or outer face 20 of the back wall panel when the barbecue 10 is in a folded condition, as shown in FIGURE 3. The side wall panels 14 and 16 are of the same length as the rear wall panels so that, in the erected condition, all of the walls are of the same height.

The side wall panels 14 and 16 have outer free edges which are provided with laterally inturned flanges 30 and 32, the flanges being adapted to abut, when the side wall panels are folded flat onto the outer face 20 of the back wall 12, as shown in FIGURE 3 and the outer side edges, as defined by the flanges 30 and 32, lie along the longitudinal center line of the rear wall 12 so that the side wall panels 14 and 16 are of a combined width equal to the transverse width of the rear wall panel. Each of the side wall panels is of an equal width and of an equal height so that the side wall panels are of equal dimensions and when the side wall panels are folded about the piano hinges 28 onto the rear or outer face 20 of the rear wall 12, the side wall panels 14 and 16 lie entirely within the cross-sectional area of the rear wall, which makes for an extremely compact assembly for transportation and storage.

In the use of the barbecue 10, the walls are erected, as shown in FIGURE 1, so that the walls are vertically orientated and the side walls 14 and 16 are normal to or disposed at right angles to the rear wall, with the side walls being in parallel relationship and having inner confronting faces 34 and 36.

A fire pan 38, which is adapted to contain charcoal or the like (not shown) and which defines a combustion chamber for such combustible materials, preferably charcoal, is provided and the opposing end walls 40 thereof are formed with angular hook-like flanges 42, the flanges having an inner horizontal portion 44 and an outer free vertical leg portion 46. The inner faces 34 and 36 of the side wall panels 14 and 16 are formed with means complemental, in hook-like fashion, with the hook-like end flanges 42 so as to support the fire or combustion pan 38 in a secure horizontal position between the back wall and side walls. Thus, right angle supporting hooks 48 are provided with the horizontal flanges 50 thereof having depending vertical flanges 52 on their outer edges, the flanges 52 being suitably fastened, as by soldering, brazing or bolt assemblies or riveting, to the inner faces 34 and 36 of the side wall panels, as shown in FIGURE 2. The horizontal flanges 50 have upstanding vertical flanges 54, which are complemental to the depending vertical flanges 46 on the hook-like lips 42 on the ends of the pan whereby an interfitting hook-like arrangement is provided, as shown in FIGURE 2.

A grill 56 is provided for supporting foodstuffs, such as meat, with the grill being disposed at selected vertical points above the fire pan for various degrees of cooking and flavoring of the foodstuffs on the grill by means of the burning charcoal in the fire pan. The grill 56 comprises an outer wire frame 58, having opposing front and rear side portions 60 and 62 with crossbars 64 extending in parallelism between the side portions 60 and 62, the crossbars 64 being evenly spaced apart. The grill 56 has upwardly and outwardly curved end portions 66 and 68 and such portions, along with the inner wire or rod-like portion 62 are provided with hooks 70 of right angle configuration and having horizontal flanges 72 and depending vertical flanges 74 which are adapted to hook over the vertical flanges 76 of hook-like supporting bars or brackets 78, formed similar to the supports 48. The angular support brackets 78 are disposed on the inner faces of the side panels and the rear panel and are arranged at different levels so that the grill can be supported at different heights above the fire pan, as can be appreciated from a consideration of FIGURE 2.

It can be appreciated, from a consideration of FIGURE 3, that the side panels 14 and 16 lie flat on the outer rear face 20 of the rear wall panel 12, when the barbecue 10 is in a collapsed state for transportation or storage and that the grill fits on the inner face or faces 34 and 36 and does not project beyond the bottom edge portion 80 of the rear wall panel and lies between such bottom edge portion and the lowermost supporting bracket or support 48 formed on the side walls. Thus, the grill lies flat on the inner face or faces of the side walls with the fire pan 38 seated thereupon. The components are, therefore, compactly assembled and may be tied together, if desired, but, in any event, the three components, namely the frame structure which is made up of the back wall and hinged side walls, the grill 56 and the fire pan 38 are all so related that the entire barbecue unit 10 can be easily placed in a small carrying space, such as the trunk of a car, and can be stored in a small storage space.

When it is desired to use the barbecue outdoors, the walls are vertically erected with the rear wall resting on its lower edge portion 80 and the side walls are swung about the piano hinges 28 into angular relationship with the rear wall and then the fire pan 38 is securely fitted in place by virtue of the hook-like supporting arrangement and the grill is positioned by virtue of a similar hook-like supporting arrangement at the desired height above the fire pan, within which charcoal is placed to be ignited for the purpose of cooking and flavoring the foodstuffs, such as meat, disposed on the body forming, cross rods 64 of the grill.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. A portable compactly collapsible barbecue comprising a rigid back wall having an inner face and an outer face and having opposed side edges, opposing rigid sidewalls equal in height to the back wall, each of said side walls having an inner face and an outer face and opposed side edges, and means hingedly securing one side edge of each side wall to the opposing side edges of the back wall for movement of the side walls between a first position in laterally spaced parallel relation to each other projecting forwardly from the inner face of the back wall and a second position paralleling and directly overlying the outer face of said back wall, said back wall and said side walls being rectangular, said side walls being of a width no greater than one-half the width of the back wall whereby said side walls, in the second position, are both positionable flat on the outer face of the back wall and in coplanar relation to each other, said side walls, in said second position, lying within the peripheral confines defined by the peripheral edges of said back wall, support means affixed to the inner faces of the side walls in a position so as to oppose each other in the first position of the side walls, a firepan extensible between the side walls in the first position thereof and interlockable with the support means for forming a stabilizing connection therebetween, and a food supporting grill extensible between the side walls in spaced overlying relation to the firepan and similarly engageable with the support means.

2. The barbecue of claim 1 wherein said back and side walls each comprise solely a thin rigid panel.

3. The barbecue of claim 2 wherein the unsecured edge of each of said side walls has a laterally directed flange therealong of a width generally corresponding to the projection of the pan and grill support means.

References Cited
UNITED STATES PATENTS

| 1,327,115 | 1/1920  | Robinson | 126—9 |
| 1,404,808 | 1/1922  | Taylor   | 126—9 |
| 2,307,914 | 1/1943  | Bitney   | 126—25 X |
| 2,556,365 | 6/1951  | McKnight | 126—25 X |
| 2,826,984 | 3/1958  | Krull    | 126—25 X |
| 2,842,043 | 7/1958  | Reuland  | 99—259 |
| 2,959,165 | 11/1960 | Mark     | 126—9 |
| 3,152,586 | 10/1964 | Russell  | 126—9 |

FREDERICK KETTERER, *Primary Examiner.*

U.S. Cl. X.R.

126—9